United States Patent [19]

Hunter et al.

[11] 4,161,244

[45] Jul. 17, 1979

[54] MAIL BUFFER FEEDER SYSTEM

[75] Inventors: James R. Hunter, Chadds Ford; Sebastian J. Lazzarotti; Robert S. Bradshaw, both of Broomall, all of Pa.

[73] Assignee: Burroughs Corporation, Detroit, Mich.

[21] Appl. No.: 892,190

[22] Filed: Mar. 31, 1978

[51] Int. Cl.$^2$ .............................................. B65G 47/30

[52] U.S. Cl. .................................. 198/347; 198/447; 198/466; 198/492

[58] Field of Search ............ 214/11 R; 198/347, 447, 198/466, 492

[56] References Cited

U.S. PATENT DOCUMENTS 3,339,705 9/1967 Burkhardt et al. .............. 198/347 X

*Primary Examiner*—Robert G. Sheridan

*Attorney, Agent, or Firm*—Francis A. Varallo; Edmund M. Chung; Kevin R. Peterson

[57] ABSTRACT

A mail processing system is described for performing several basic functions. The first of these entails the receipt by the system of mail in single file or in small clumps which arrive synchronously or asynchronously in a random manner. Secondly, the system stores or buffers the mail in an orderly shingled fashion wherein the first batch of mail stored is the first batch to subsequently exit the buffer. Finally, the third function involves the output feeding of the shingled batch of mail from the system to further processing equipment. The system may advantageously include for some applications one or more singulators for generating from the shingled batch, a defined stream of mail pieces separated from one another. It is a significant feature of the buffer feeder system that the above-mentioned functions are interwoven such that the system is capable of receiving and storing one batch of mail while concurrently feeding out a previously stored batch.

15 Claims, 2 Drawing Figures

MAIL BUFFER FEEDER SYSTEM

CROSS REFERENCE TO RELATED APPLICATION

In copending patent application, Ser. No. 846,384, for "Singulation Device for Mail" by S. James Lazzarotti, Robert S. Bradshaw and James R. Hunter, there is described and claimed a singulator for separating into single spaced-apart items, a collection of mail pieces. Such a device may find particular application in the present system. Both the reference application and the present one are assigned to the same assignee.

BACKGROUND OF THE INVENTION

The functions performed by a buffer feeder system are basic to document handling. Such systems have been developed for use in processing letter mail. However, these systems are unable to deal effectively with the variation in sizes encountered with inter-mixed mail. Another significant difficulty arises from their basic design philosophy wherein an attempt is made to simultaneously feed documents from a single-stage feeding device, while receiving or buffering incoming documents in the same device. Thus the two portions of the device are usually compromised with respect to feeding performance or buffering performance, in order to realize both functions.

The above noted shortcomings are overcome in the design of the system of the present invention.

SUMMARY OF THE INVENTION

In accordance with a preferred embodiment of the invention, the buffer feeder system comprises at least two substantially similar subsystems. An input conveyor and a transfer conveyor are combined to carry edge supported mail pieces to both subsystems. Included within each subsystem are a gate, a buffer feeder conveyor and a singulator. The documents exiting each subsystem are merged on a common output conveyor to provide a defined uniform stream of spaced-apart mail pieces from the system.

In operation, each subsystem has the capability of receiving and buffering documents or of operating as a feeder to deliver documents. However, both functions cannot be performed within a subsystem concurrently. For this reason, a pair of subsystems are integrated such that at any given time, one acts as a buffer while the other acts as a feeder. The two subsystems then periodically reverse their operating roles, so that the system of the present invention may both receive and feed documents at the same time. Since neither subsystem is called upon to operate concurrently in a buffer and a feeder mode, the design compromises mentioned hereinbefore as being inherent in present day systems, do not exist in the system of the invention.

These and other features of the invention will become more fully apparent in the detailed description of the system and the mode of operation, which follow.

DESCRIPTION OF THE PREFERRED EMBODIMENT

Figure 1:
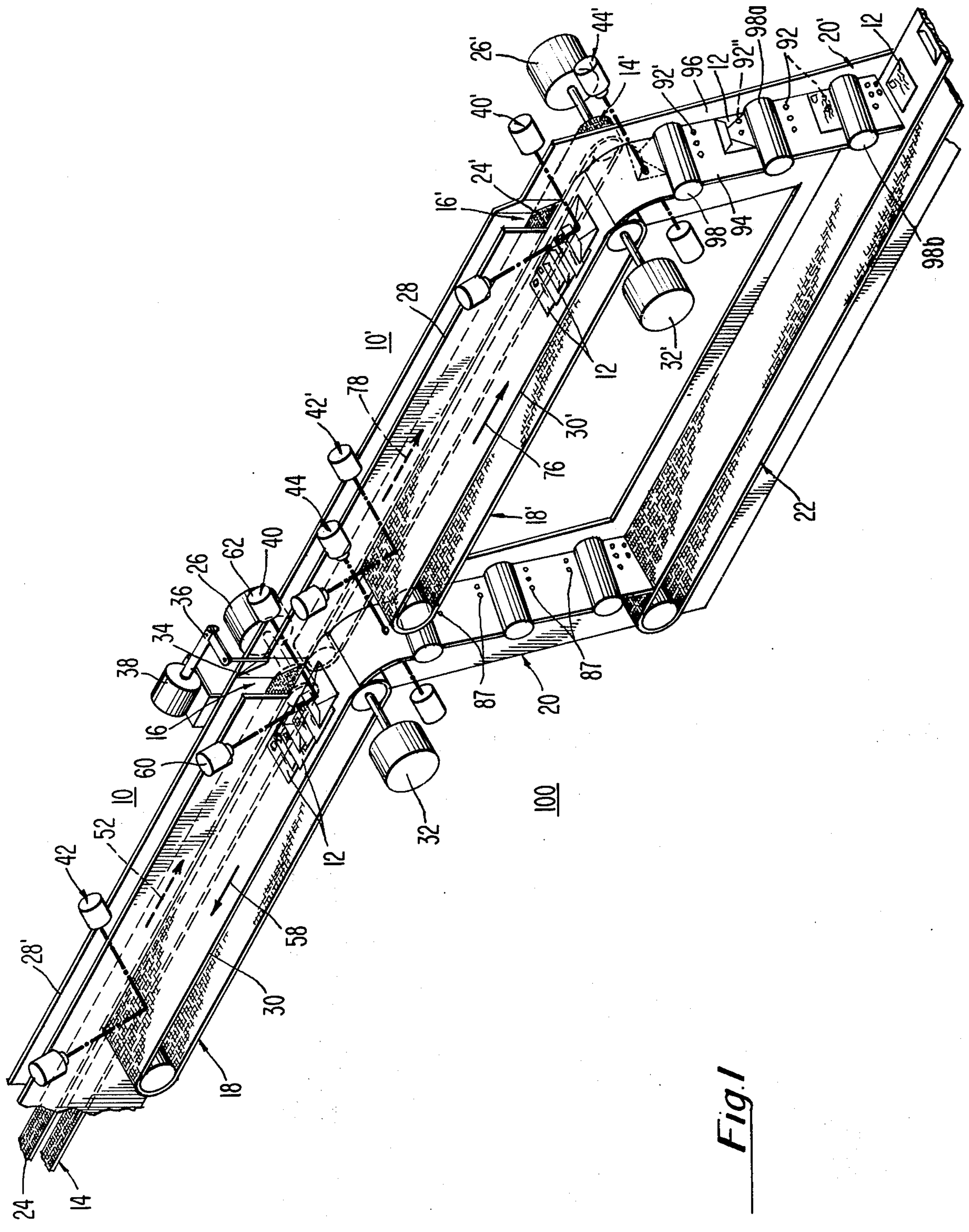
FIG. 1 is a pictorial view of the buffer feeder system of the present invention, including details of the pair of subsystems of which it is comprised.

FIG. 1 illustrates in somewhat simplified fashion the components which make up the buffer feeder system 100 of the present invention. The system is comprised of a pair of substantially similar subsystems 10 and 10′. Documents 12, such as flat mail pieces, are carried on edge to the subsystems by transport means comprised of an input conveyor 14 and an extension thereof, termed a transfer conveyor 14′. The function and operation of these conveyors will be described hereinafter. The source of the documents to be processed may be, for example, a flat mail culler. The subsystems 10 and 10′ further include respective gates 16, 16′, buffer feeder conveyors 18, 18′ and, if required for particular operations, singulators 20, 20′. The documents outputted from the respective singulators are merged on a common output conveyor 22 which transports them to succeeding processing equipment (not shown). As noted hereinbefore, at any given time, one of the subsystems may assume the role of either a buffer or a feeder. Concurrently, the other subsystem will then assume the opposite role. At a predetermined succeeding time and periodically thereafter, the operating roles of the two subsystems will be reversed. From a system standpoint, documents are being stored or buffered at the same time that previously stored documents are being fed out.

Considering in greater detail the mechanical and electro-mechanical elements utilized to implement the functions provided by each of the subsystems of FIG. 1, the input conveyor 14 includes a relatively narrow belt 24 which traverses subsystem 10 and is driven by a motor 26 adapted to be turned on and off during the mail processing cycle. Similarly, the transfer conveyor 14′ comprises a narrow belt 24′ which traverses subsystem 10′ and is driven independently by a motor 26′ which runs continuously during the processing cycle.

The documents 12 to be processed are carried edgewise from their source into the buffer feeder system 100 on the input conveyor belt 24 where they are either buffered in subsystem 10 or transported to subsystem 10′ via the transfer belt 24′. Parallel guide members 28 and 28′ positioned on either sides of the belts retain the edgewise alignment of the documents being transported.

The buffer feeder conveyors 18 and 18′ of the respective subsystems 10 and 10′ each include a wide belt 30, 30′, positioned alongside the input conveyor belt 24 and the transfer belt 24′. The buffer feeder conveyors 18, 18′ are driven by respectively stepping motors 32, 32′ capable of rapid starts and stops. The uppermost surfaces of the input conveyor belt 24, the transfer belt 24′ and the buffer feeder conveyor belts 30, 30′ all lie substantially in a common horizontal plane. Subsystems 10 and 10′ include respective gates 16 and 16′. While the gates may be identified in construction, reference to FIG. 1 indicates that the gate 16 associated with the upstream subsystem 10 must be movable, while gate 16′ in the downstream subsystem 10′ remains in a fixed open position throughout the processing cycle. This is so because gate 16 must be capable of either permitting mail to continue down the transfer conveyor 14′ or be diverted onto the buffer feeder conveyor 18. Gate 16′ on the other hand, is at the end of the transfer conveyor 14′ and serves only to direct the documents onto the buffer feeder conveyor 18′ of subsystem 10′.

Considering gate 16 shown in FIG. 1, a vane 34 is pivotally mounted in an opening of the guide member 28. The vane 34 is coupled by means of a movable arm 36 to a solenoid actuator 38. In operation, the vane 34 may assume a first position in which it is parallel to, and becomes an extension of, the guide member 28, thereby permitting the documents 12 to continue past gate 16 to subsystem 10'. Alternately, the vane 34 may be pivoted toward the inner surface of the opposite guide member 28'. This action blocks the further movement of the documents on the input conveyor belt 24, and diverts them onto the buffer feeder conveyor belt 30. The documents come to rest in shingled fashion as explained hereinafter.

Each of the subsystem 10, 10' includes a plurality of photocell assemblies which are utilized in the control of the buffer feeder cycle. Thus, subsystem 10 contains a first photocell assembly 40 positioned to sense the documents being directed onto the buffer feeder conveyor 18, and for providing electrical signals to initiate the incremented motion of the last mentioned conveyor during the buffering action. A second photocell assembly 42 positioned substantially at the extremity of the buffer feeder conveyor 18 opposite to that scanned by the first photocell assembly 40 provides a signal indicating that the conveyor is full. Finally, a third photocell assembly 44 is positioned upstream from, but in proximity to the first or input stage of singulator 20 to provide electrical signals for initiating the motion of buffer feeder conveyor 18, thereby causing the batch of documents previously buffered, to be fed into the singulator 20 during the feeding portion of the processing cycle.

The function and operation of the photocell assemblies 40', 42' and 44' associated with subsystem 10' are identical respectively to those of photocell assemblies 40, 42 and 44 described hereinbefore.

Figure 2:
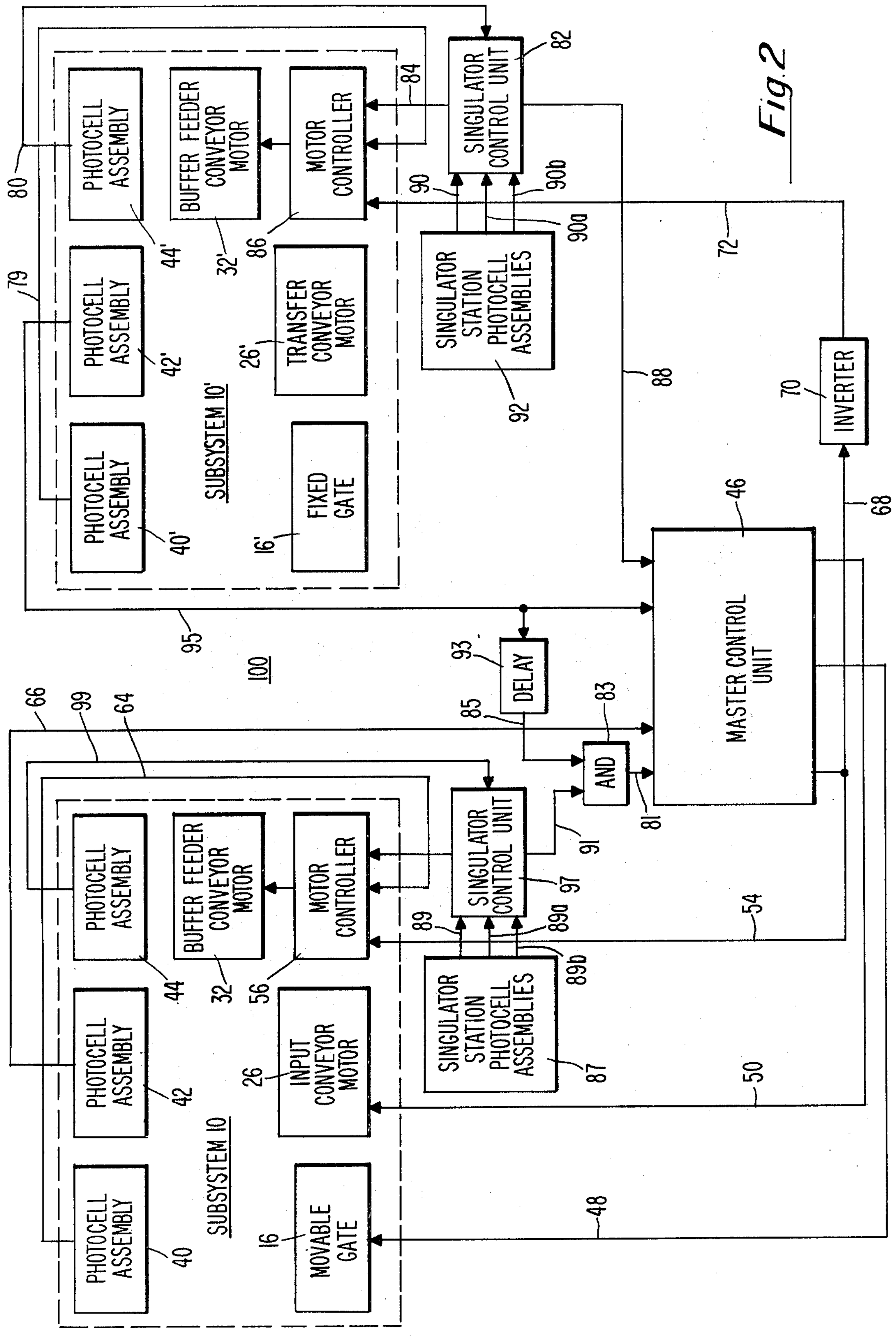
FIG. 2 depicts in block form the major components of the system of FIG. 1 and the control functions which permit the operation of the subsystems in respective concurrent buffer and feeder modes.

With general reference to FIG. 1 and more specific reference to FIG. 2, the operation of the system will now be considered in detail. It is assumed initially that subsystem 10 is in the buffer mode and that concurrently subsystem 10' is in the feeder mode. A common master control unit 46 is provided which is comprised of conventional switching networks capable of receiving input signals from the components in both subsystems and of providing output signals to the latter to enable them to perform the intended functions.

Considering initially subsystem 10 which is in the buffer mode, the master control unit 46 supplies an output signal via line 48 to gate 16, causing it to be in the "open" condition; a second signal on line 50 to input conveyor motor 26 to place it in the "on" or "run" condition wherein the uppermost document-bearing surface of belt 24 moves in the direction of arrow 52; and a third signal on line 54 to the motor controller 56 associated with the buffer feeder conveyor motor 32 to condition the motor for operation in a "reverse" direction, such that the motion of buffer feeder conveyor belt 30 is opposite that of the input conveyor as indicated by arrow 58.

Mail pieces arrive at subsystem 10 via the input conveyor 14. The gate 16 is open and each mail piece is diverted from the input conveyor belt 24 and allowed to rotate ninety degrees about its axis of motion in a manner to cause it to lie flat on top of the buffer conveyor belt 30. The photocell assembly 40 comprises a light source 60 and detector 62. The detector 62 senses the reflected light from the mail piece 12 and provides a signal to the motor controller 56 via line 64. The motor controller 56 turns the conveyor motor 32 "on" to advance the belt 30 and transport the mail piece 12 in the direction of the arrow 58 which is opposite to that of the input conveyor 14. As the mail piece moves in the direction of arrow 58, it leaves the sensing area of photocell assembly 40, and the dark conveyor belt 30 does not reflect as much light. The photocell assembly 40 changes state, removing the signal on line 64 to the motor controller 56 and turning motor 32 "off". The process is repeated for each incoming mail piece, and the resulting intermittent motion of the buffer feeder conveyor 18 generates a shingled batch of documents. The configuration of documents is such that documents arriving at the gate 16 and being placed on the buffer conveyor belt 30 lie on top of the documents already on the conveyor. For example, the leading edges of the documents 12 may be spaced approximately one inch apart. The size of the stored batch of mail is a function of the length of the buffer feeder conveyor 18 and may be selected to suit particular applications.

The function of photocell assembly 42 is to sense when the buffer feeder conveyor 18 has been filled with mail. When the edge of the shingled mail stack moves to the left and enters the field of the photocell assembly 42, the light reflected from the initially stored document is sensed thereby and a signal is transmitted via line 66 to the master control unit 46. The latter produces an output signal on line 50 which is applied to the input conveyor motor 26, turning it "off", and stopping the motion of the input conveyor 14. Therefore, no further mail pieces are deposited upon the buffer feeder conveyor 18.

During the buffering operation in subsystem 10, a feeding operation was taking place in subsystem 10' of the batch of documents 12 stored therein in its last buffer mode. During this feeding mode in subsystem 10', the status of the various subsystem components are as follows. The output signal from the master control unit 46 appearing on line 54, (which signal, it will be recalled, conditioned the motor controller 56 in subsystem 10 for "reverse" operation as required by the buffer action) is applied via line 68 to an inverter 70. The output of the latter on line 72 conditions motor controller 86 for "forward" operation, that is, the buffer feeder conveyor belt 30' moving in the direction of arrow 76. The gate 16' is fixed in the "open" position and the transfer conveyor motor 26' is in a constant "run" mode with belt 24' moving in the direction of arrow 78. Notwithstanding the latter, no documents are delivered to subsystem 10' since all are being gated into subsystem 10 for buffering. Photocell assemblies 40' and 42' are also ineffective during the feeding operation.

The motion of the buffer feeder conveyor 30' during feeding is under the control of photocell assembly 44' which senses the presence of mail in the input stage of the singulator 20'. If no mail is present in the last mentioned stage, the photocell assembly 44' transmits a signal via line 80 into a singulator control unit 82, which comprises conventional switching circuits and in turn routes an output signal to line 84. The latter signal is applied to the buffer feeder conveyor motor 32' by way of its motor controller 86 and the conveyor 18' is advanced toward the singulator 20'. When one or more pieces of the shingled mail batch are delivered to the singulator input stage, their presence is detected by photocell assembly 44' which causes the photocell assembly 44' to change state and apply a signal via line 80, singulator control unit 82 and line 84 which ultimately causes the buffer feeder conveyor motor 32' to be halted. This process is repeated each time the singulator 20' removes the mail pieces from its initial singulation stage.

The termination of the buffer mode in subsystem 10 was previously described as entailing the turning off of the input conveyor motor 26 in response to the sensing of a buffer feeder conveyor 18 "full" condition by photocell assembly 42. However, the reversal of operating roles of the pair of subsystems 10 and 10' does not occur until a switchover signal is applied on line 88 to the master control unit 46 by the singulator control 82. The latter unit 82 receives inputs on lines 90, 90*a*, 90*b*, from the plurality of singulator stage photocell sensors 92, and an output on line 88 indicates that no further documents are undergoing the singulation process. In this manner, if the buffering or storage of documents 12 in subsystem 10 is terminated prior to the completion of the feeding cycle in subsystem 10', the latter operation will continue until all of the documents previously stored on buffer feeder conveyor 18' have been fed out.

It has been mentioned previously that the use of singulators to generate a spaced apart stream of mail pieces may be advantageous in some applications. Moreover it was suggested that the singulator described and claimed in the reference Ser. No. 846,384 application might be used in the present buffer feeder system. It is that singulator which is depicted in highly simplified form in FIG. 1. It should be emphasized that the inventive concepts taught herein are not limited to the use of this particular singulator, and in fact such concepts may be practiced in the absence of any singulator. However, for purposes of example, a brief description of the singulator of the reference patent follows. The more detailed description of the device and its mode of operation appear in the above-identified application and are intended to be included herein by reference.

With reference to singulator 20', the device incorporates a slide 94 having a compound slope which enhances the gravitational forces acting upon the documents. The slide incorporates a single registration wall 96 and the documents are guided down the incline in an orderly and uniform manner with one common side edge registration. Situated in spaced-apart relation along the slide are singulating stages or stations, including respectively friction rollers 98, 98*a*, 98*b* and document sensing means 92 on both sides thereof. Documents travelling down the slide are also leading edge registered as they impact and momentarily park at each singulating roller in preparation for further processing in equipment located beyond the singulator, but not shown in FIG. 1. The number of singulation stations is a function of the desired singulation reliability and is limited only by physical space constraints. In practice, two or three stations will generally provide the desired document separation.

In a typical singulation operation, the rotation of a first friction roller 98 associated with a first singulation station is controlled by a pair of photocell sensor assemblies 92 and clock timing means (not shown). The first sensor assembly 92' is located downstream adjacent the first roller 98 and the second sensor assembly 92", upstream adjacent a second roller 98*a* associated with the second singulation station. It is these photocell assemblies 92 associated with the respective stations which are represented functionally by block 92 in FIG. 2 and which supply status signals via lines 90, 90*a* and 90*b* to the singulator control unit 82.

Initially, it is assumed that one or more documents 12 are in the first station and that both rollers 98, 98*a* are stationary. The sensing of the absence of a document at the second station by the second sensor assembly 92" initiates the rotation of the first roller 98. This rotation is limited to a predetermined angle, for example ninety degrees, unless halted in response to the first sensor assembly's (92') detection of a document moving toward the second station. If rotation has progressed through the predetermined angle and has stopped, a dwell period is initiated, during which detection of a document by the first assembly 92' will temporarily halt the resumption of rotation of the first roller 98. On the other hand, if no document is detected, the second station remains unoccupied, and following the dwell period, rotation of the first roller 98 will recommence until halted by the second sensor assembly's (92") detection of a document 12 at the second station.

It should be noted that should more than one document arrive at a singulation station, succeeding stations operated in the manner described hereinbefore will separate them and produce the desired singulation output.

When the switchover input signal on line 88 is received by the master control unit 46 from the singulator control unit 82, indicating that feeding in subsystem 10' is complete, the master control unit 46 performs as follows. Output signals appearing on lines 48, 50 and 54 respectively "close" gate 16; turn "on" the input conveyor motor 26; and condition motor controller 56 to cause its associated motor 32 to drive buffer feeder conveyor 30 in a "forward" direction (that is, opposite to arrow 58). By virtue of inverter 70, the last signal, also appearing on line 68, causes the motor controller 86 for motor 32' to move buffer feeder conveyor 30' move in a "reverse" direction, that is, opposite to the direction of the auxiliary conveyor 14' and arrow 76. The gate 16' in subsystem 10' remains open, while the auxiliary conveyor motor 26' is continuously "on". Subsystem 10 is now in the feeder mode; subsystem 10', in the buffer mode. Documents now travel down the input conveyor 14 from an upstream source, (not shown), past the gate 16 in subsystem 10, onto the auxiliary conveyor 14', where they pass through gate 16' and are collected in shingled fashion on buffer feeder conveyor 30' in subsystem 10'.

The buffer and feeder modes described hereinbefore are now performed in identical fashion by the opposite subsystems. Photocell assembly 44 in subsystem 10 controls the feed operation of the buffer feeder conveyor motor 32 by virtue of signals applied to motor controller 56 via line 99 and singulator control unit 97 for singulator 20. Concurrently, photocell assembly 40' in subsystem 10' controls the buffer operation of the buffer feeder conveyor motor 32' by virtue of signals applied to motor controller 86 via line 79. There is, however, a special consideration which must be taken into account before the next reversal of operating roles is made. When the buffer feeder conveyor of subsystem 10' is full, photocell assembly 42' signals the master control unit 46 via line 95 to turn off the input conveyor motor 26. The master control unit performs this function via line 50. In the preceding cycle, the switchover signal generated by the singulator control unit 82 and signifying the completion of the feed cycle in subsystem 10' was immediately effective in reversing the subsystem modes. Since subsystem 10 had been in a buffer mode, all documents arriving via the input conveyor 14 were gated to its associated buffer feeder conveyor 30. No documents were present on the auxiliary conveyor 14' at the time of subsystem mode switchover. In the present case, it is necessary to delay the reversal of operating modes to take care of the situation where the feeding operation is already completed, or nearly completed, in subsystem 10 at the time the buffer storage in subsystem 10' is substantially full. This delay will permit the documents remaining on the auxiliary conveyor 14', after the input conveyor motor 26 has been turned "off", to be deposited on the buffer feeder conveyor 30' of subsystem 10'. It should be apparent that the areas on the last mentioned conveyor 30' selected to be scanned by photocell assembly 42' will permit the reception of the remaining documents even after the "full" indication by this photocell assembly. The duration in the delay of the signal is a function of the length of the auxiliary conveyor and its speed of operation.

Reference to FIG. 2 indicates that the "full" signal from photocell assembly 42' appearing on line 95 is applied in common to the master control unit 46 to effect the turn off of the input conveyor and to the delay unit 93. A "feed complete" signal appears on line 91 from the singulator control unit 97 as a result of singulator 20 station status signals on lines 89, *89a*, *89b* from the station photocell assemblies 87. The signal output on line 91 and the output of the delay unit 93 on line 85 are applied to the input terminals of a logic AND gate 83. The presence of a signal on both of the latter terminals causes an output signal from AND gate on line 81, which is applied to the master control unit 46 to effect a switchover in the operating roles of the subsystems.

Finally, as seen in FIG. 1 the documents exiting the singulators 20 and 20' when the respective subassemblies 10 and 10' are in a feed mode, are deposited upon and merged on a common output conveyor 22 when they appear in a spaced-apart stream. The latter conveyor is utilized to transport the documents to succeeding processing equipment further downstream, which however is not shown.

In conclusion, the buffer feeder system described herein fills a basic need in the document handling art, and does so in an efficient and reliable manner. The system is characterized by its utilization of well-known components, operated in a relatively simple, straightforward manner. It should be understood that changes and modifications of the system may be needed to suit particular requirements. For example, another system identical to the one described may be operated in parallel with the latter, receiving mail from common output and transfer conveyors. Each system would discharge mail onto its respective output conveyor, and the two output conveyors merged to provide a single higher overall throughput. This and other changes and modifications insofar as they are not departures from the true scope of the invention, are intended to be covered by the following claims.

What is claimed is:

1. A buffer feeder system for processing mail pieces comprising:

at least a first and a second subsystem having transport means for conveying said mail pieces thereto, said first and second subsystem having respective first and second buffer feeder conveyor means positioned in operative relationship with said transport means, first and second gating means associated respectively with said first and second subsystem and being operatively positioned with respect to said transport means for selectively directing said mail pieces onto said first and second buffer feeder conveyor means, at least first and second mail sensing means positioned at substantially the opposite extremities of the buffer feeder conveyor means of each subsystem, master control means coupled to both subsystems for initiating concurrently a buffer mode in one subsystem and a feeder mode in the other subsystem, said master control means causing at a predetermined time said first subsystem to assume a buffer mode and said second subsystem to assume a feeder mode wherein said first gating means assumes a physical orientation which causes all of the mail pieces being conveyed by said transport means to be directed onto said first buffer feeder conveyor means, said master control means conditioning said first buffer feeder conveyor means for motion in a direction to receive and buffer said mail pieces, said first mail sensing means of said first subsystem being positioned in proximity to said first gating means and being coupled to said first buffer feeder conveyor means, said first mail sensing means being responsive to the presence of each mail piece deposited upon the latter conveyor means for incrementing the conveyor motion in a fixed step to produce a shingled batch of mail pieces, said second mail sensing means of said first subsystem being coupled to said master control means and providing an electrical signal thereto indicative of a full condition in said first buffer feeder conveyor means, said master control means conditioning said second buffer feeder conveyor means at said predetermined time for motion in a direction to feed out the shingled batch of mail pieces previously stored on the last mentioned conveyor means.

2. A system as defined in claim 1 further characterized in that said first and second buffer feeder conveyor means are positioned in side-by-side relationship with said transport means.

3. A system as defined in claim 2 further characterized in that said mail pieces are conveyed by said transport means in edge oriented fashion, each edge oriented mail piece exiting said first gating means and upon contact with said first buffer feeder conveyor means, rotating about its axis of motion and falling flat upon the last mentioned conveyor means.

4. A system as defined in claim 3 further characterized in that the motion of said first buffer feeder conveyor means to receive and buffer said mail pieces is in a direction opposite to that of said transport means, and the motion of said second buffer feeder conveyor means to feed out the previously stored batch of mail pieces is in the same direction as said transport means.

5. A system as defined in claim 4 further characterized in that the first and second subsystem are oriented in-line, such that, with respect to the direction of the mail pieces being conveyed thereto by said transport means, the first subsystem lies upstream from the second subsystem.

6. A system as defined in claim 5 further characterized in that said transport means is comprised of an input conveyor which traverses the length of said first subsystem and a transfer conveyor which traverses the length of said second subsystem, said input conveyor and said transfer conveyor being positioned in close proximity to each other and being oriented in substantially the same horizontal plane, such that, upon selection of a particular physical orientation of said first gating means by said master control means, a mail piece is conveyed past the first subsystem and is delivered to the second downstream subsystem.

7. A system as defined in claim 6 wherein said input conveyor and transfer conveyor include a pair of parallel, vertically disposed guide members positioned respectively on opposite sides of the last mentioned conveyors, for retaining the edge orientation of said mail pieces until they exit a gating means.

8. A system as defined in claim 7 wherein said first gating means comprises a movable vane mounted in an opening in a first of said guide members, said master control means being coupled to said first gating means and providing electrical signals thereto for respectively causing said vane to assume a closed portion parallel to the first of said guide members thereby permitting mail pieces to bypass the first subsystem, and an open position wherein said vane is pivoted toward the inner surface of the second of said guide members to cause the mail pieces to be diverted onto said first buffer feeder conveyor means of said first subsystem, said second gating means being comprised of a fixed member angularly disposed in an opening in said first of said guide members, and providing a continuously open gate position in said second subsystem.

9. A system as defined in claim 8 further including a pair of singulators each having a plurality of stations and being positioned respectively in proximity to said first and second buffer feeder conveyor means, said singulators being operatively disposed to receive the mail pieces being fed out from the last mentioned conveyor means, and for generating respective streams of spaced-apart mail.

10. A system as defined in claim 9 further including a pair of third mail sensing means positioned in proximity to the respective input stations of said singulators, said pair of third mail sensing means being coupled respectively to said first and second buffer feeder conveyor means and being responsive to the absence of a mail piece in the input of a singulator associated with a subsystem in the feeder mode, the third mail sensing means of the last mentioned singulator initiating the motion of the buffer feeder conveyor means in the latter subsystem to effect the delivery of at least one mail piece to the singulator.

11. A system as defined in claim 10 further characterized in that said first, second and third mail sensing means are photocell assemblies.

12. A system as defined in claim 11 further including a common output conveyor operatively positioned with respect to said pair of singulators for receiving and merging the singulated mail streams therefrom.

13. A system as defined in claim 12 wherein said input conveyor and transfer conveyor each include a drive motor, the drive motor of said input conveyor being coupled to said master control means and being capable of being turned "on" and "off" in response to signals received by said master control means during a mail processing cycle, the drive motor of said transfer conveyor being unconditionally "on" throughout said processing cycle.

14. A system as defined in claim 13 wherein said pair of singulators each includes a plurality of photocell assemblies associated with the singulation stations thereof, said photocell assemblies in each singulator being coupled to a singulator control means for providing thereto electrical signals indicative of the status of each of the stations.

15. A system as defined in claim 14 further characterized in that said master control means comprises a plurality of input terminals and a plurality of output terminals, said second mail sensing means of said first and second subsystem being coupled to a first and second input terminal, a first output terminal of said master control means being coupled to said input conveyor drive motor, the receipt by said master control means of a buffer feeder conveyor means "full" signal from said second mail sensing means causing an output signal to be applied to said input conveyor drive motor to turn it "off", said singulator control means of said first subsystem having an output terminal, an AND gate having a pair of input terminals and an output terminal coupled to a third input terminal of said master control means, means coupling the output terminal of the last mentioned singulator control means to one of the input terminals of said AND gate, delay means coupling said "full" signal from the second mail sensing means of said second subsystem to the other input terminal of said AND gate, said singulator control means of said second subsystem having an output terminal coupled to a fourth input terminal of said master control means, a second output terminal of said master control means being coupled to said first gating means, and a third output terminal of said master control means being coupled to said first buffer feeder conveyor means, inverter means coupled said third output terminal of said master control means to said second buffer feeder conveyor means, the electrical signals received by said master control means alternately on its third and fourth input terminals, causing respective groups of signals to appear on all of its output terminals, to effect the periodic reversal of operating modes in said first and second subsystem.

* * * * *

UNITED STATES PATENT AND TRADEMARK OFFICE
CERTIFICATE OF CORRECTION

PATENT NO. : 4,161,244

DATED : July 17, 1979

INVENTOR(S) : James R. Hunter, et al.

It is certified that error appears in the above-identified patent and that said Letters Patent are hereby corrected as shown below:

Column 2, line 58, change "identified" to --identical--.

Column 9, line 17, change "portion" to --position--.

Column 10, line 46, change "coupled" to --coupling--.

Signed and Sealed this

*Ninth* Day of *October 1979*

[SEAL]

*Attest:*

RUTH C. MASON
*Attesting Officer*

LUTRELLE F. PARKER
*Acting Commissioner of Patents and Trademarks*